United States Patent
Niklaus et al.

(10) Patent No.: US 12,169,909 B2
(45) Date of Patent: Dec. 17, 2024

(54) MANY-TO-MANY SPLATTING-BASED DIGITAL IMAGE SYNTHESIS

(71) Applicant: Adobe Inc., San Jose, CA (US)

(72) Inventors: Simon Niklaus, San Jose, CA (US); Ping Hu, Boston, MA (US)

(73) Assignee: Adobe Inc., San Jose, CA (US)

( * ) Notice: Subject to any disclaimer, the term of this patent is extended or adjusted under 35 U.S.C. 154(b) by 351 days.

(21) Appl. No.: 17/714,356

(22) Filed: Apr. 6, 2022

(65) Prior Publication Data
US 2023/0325968 A1    Oct. 12, 2023

(51) Int. Cl.
  *G06T 3/4007*  (2024.01)
  *G06T 3/18*  (2024.01)
  *G06T 5/50*  (2006.01)

(52) U.S. Cl.
  CPC .............. *G06T 3/4007* (2013.01); *G06T 3/18* (2024.01); *G06T 5/50* (2013.01); *G06T 2207/20016* (2013.01); *G06T 2207/20221* (2013.01)

(58) Field of Classification Search
  CPC ........... G06T 3/4007; G06T 3/18; G06T 5/50; G06T 2207/20016; G06T 2207/20221
  See application file for complete search history.

(56) References Cited

U.S. PATENT DOCUMENTS

2022/0303495 A1* 9/2022 Choe .................. G06T 7/207
2023/0326044 A1  10/2023 Niklaus et al.

OTHER PUBLICATIONS

"Xiph.org Video Test Media (derf's collection)", Xiph.Org [retrieved Feb. 17, 2022]. Retrieved from the Internet <https://media.xiph.org/video/derf/>., 18 Pages.

Baker, Simon et al., "A Database and Evaluation Methodology for Optical Flow", 11th IEEE International Conference on Computer Vision [retrieved Feb. 15, 2022]. Retrieved from the Internet <https://vision.middlebury.edu/flow/floweval-ijcv2011.pdf>., Nov. 2010, 31 Pages.

Bao, Wenbo et al., "Depth-Aware Video Frame Interpolation", Cornell University arXiv, arXiv.org [retrieved Feb. 15, 2022]. Retrieved from the Internet <https://arxiv.org/pdf/1904.00830.pdf>., Apr. 1, 2019, 10 Pages.

Bao, Wenbo et al., "MEMC-Net: Motion Estimation and Motion Compensation Driven Neural Network for Video Interpolation and Enhancement", IEEE Transactions on Pattern Analysis and Machine Intelligence vol. 43, No. 3 [retrieved Feb. 15, 2022]. Retrieved from the Internet <https://openreview.net/pdf?id=B1ljyz1B3r>., Sep. 2019, 16 Pages.

(Continued)

*Primary Examiner* — David Perlman
(74) *Attorney, Agent, or Firm* — FIG. 1 Patents

(57) ABSTRACT

Digital synthesis techniques are described to synthesize a digital image at a target time between a first digital image and a second digital image. To begin, an optical flow generation module is employed to generate optical flows. The digital images and optical flows are then received as an input by a motion refinement system. The motion refinement system is configured to generate data describing many-to-many relationships mapped for pixels in the plurality of digital images and reliability scores of the many-to-many relationships. The reliability scores are then used to resolve overlaps of pixels that are mapped to a same location by a synthesis module to generate a synthesized digital image.

20 Claims, 8 Drawing Sheets

(56) References Cited

OTHER PUBLICATIONS

Bengio, Yoshua et al., "Deep Learning", The MIT Press, Cambridge, Massachusetts [retrieved Feb. 21, 2022]. Retrieved from the Internet <https://doi.org/10.1007/s10710-017-9314-z>., Oct. 3, 2015, 706 Pages.
Brooks, Tim et al., "Learning to Synthesize Motion Blur", Cornell University arXiv, arXiv.org [retrieved Feb. 21, 2022]. Retrieved from the Internet <https://arxiv.org/pdf/1811.11745.pdf>., Jun. 20, 2019, 14 Pages.
Charbonnier, P et al., "Two deterministic half-quadratic regularization algorithms for computed imaging", Proceedings of 1st International Conference on Image Processing vol. 2 [retrieved Feb. 15, 2022]. Retrieved from the Internet <https://citeseerx.ist.psu.edu/viewdoc/download?doi=10.1.1.469.129&rep=rep1&type=pdf>., 1994, 5 Pages.
Chen, Wanli et al., "Tensor Low-Rank Reconstruction for Semantic Segmentation", Cornell University arXiv, arXiv.org [retrieved Feb. 15, 2022]. Retrieved from the Internet <https://arxiv.org/pdf/2008.00490.pdf>., Aug. 2, 2020, 19 Pages.
Cheng, Xianhang et al., "Multiple Video Frame Interpolation via Enhanced Deformable Separable Convolution", Cornell University arXiv, arXiv.org [retrieved Feb. 21, 2022]. Retrieved from the Internet <https://arxiv.org/pdf/2006.08070.pdf>., Jan. 25, 2021, 18 Pages.
Cheng, Xianhang et al., "Video Frame Interpolation via Deformable Separable Convolution", Proceedings of the AAAI Conference on Artificial Intelligence vol. 34 No. 07 [retrieved Feb. 15, 2022]. Retrieved from the Internet <https://ojs.aaai.org/index.php/AAAI/article/view/6634>., Apr. 3, 2020, 8 Pages.
Chi, Zhixiang et al., "All at Once: Temporally Adaptive Multi-frame Interpolation with Advanced Motion Modeling", Cornell University arXiv, arXiv.org [retrieved Feb. 21, 2022]. Retrieved from the Internet <https://arxiv.org/pdf/2007.11762.pdf>., Jan. 9, 2021, 16 Pages.
Choi, Byeong Doo et al., "Motion-Compensated Frame Interpolation Using Bilateral Motion Estimation and Adaptive Overlapped Block Motion Compensation", IEEE Transactions on Circuits and Systems for Video Technology, vol. 17, No. 4 [retrieved May 17, 2022]. Retrieved from the Internet <https://doi.org/10.1109/TCSVT.2007.893835>., Apr. 1, 2007, 10 pages.
Choi, Byung-Tae et al., "New Frame Rate Up-Conversion Using Bi-Directional Motion Estimation", IEEE Transactions on Consumer Electronics vol. 46, No. 3 [retrieved May 17, 2022]. Retrieved from the Internet <https://doi.org/10.1109/30.883418>., Aug. 2000, 7 pages.
Choi, Myungsub et al., "Channel Attention Is All You Need for Video Frame Interpolation", Proceedings of the AAAI Conference on Artificial Intelligence vol. 34, No. 7 [retrieved Feb. 15, 2022]. Retrieved from the Internet <https://ojs.aaai.org/index.php/AAAI/article/view/6693>., Apr. 3, 2020, 9 Pages.
Choi, Myungsub et al., "Motion-Aware Dynamic Architecture for Efficient Frame Interpolation", Proceedings of the IEEE/CVF International Conference on Computer Vision (ICCV) [retrieved Feb. 15, 2022].<https://openaccess.thecvf.com/content/ICCV2021/papers/Choi_Motion-Aware_Dynamic_Architecture_for_Efficient_Frame_Interpolation_ICCV_2021_paper.pdf>., Oct. 2021, 10 Pages.
Choi, Myungsub et al., "Scene-Adaptive Video Frame Interpolation via Meta-Learning", Cornell University arXiv, arXiv.org [retrieved Feb. 21, 2022]. Retrieved from the Internet <https://arxiv.org/pdf/2004.00779.pdf>., Apr. 2, 2020, 10 Pages.
Dikbas, Salih et al., "Novel True-Motion Estimation Algorithm and Its Application to Motion-Compensated Temporal Frame Interpolation", IEEE Transactions on Image Processing vol. 22, No. 8 [retrieved May 17, 2022]. Retrieved from the Internet <https://doi.org/10.1109/TIP.2012.2222893>., Oct. 4, 2012, 15 pages.
Ding, Tianyu et al., "CDFI: Compression-Driven Network Design for Frame Interpolation", Cornell University arXiv, arXiv.org [retrieved Feb. 21, 2022]. Retrieved from the Internet <https://arxiv.org/pdf/2103.10559.pdf>., Mar. 28, 2021, 11 Pages.
Dong, Weisheng et al., "Nonlocal Sparse and Low-Rank Regularization for Optical Flow Estimation", IEEE Transactions on Image Processing, vol. 23, No. 10 [retrieved Feb. 15, 2022]. Retrieved from the Internet <https://people.eecs.berkeley.edu/~yima/psfile/Flow_TIP_Double_Column.pdf>., 2014, 12 Pages.
Dosovitskiy, Alexey et al., "FlowNet: Learning Optical Flow With Convolutional Networks", IEEE International Conference on Computer Vision [retrieved Mar. 21, 2022]. Retrieved from the Internet <http://citeseerx.ist.psu.edu/viewdoc/download?doi=10.1.1.708.2328&rep=rep1&type=pdf>., Dec. 2015, 9 Pages.
Eldesokey, Abdelrahman et al., "Normalized Convolution Upsampling for Refined Optical Flow Estimation", Cornell University arXiv, arXiv.org [retrieved Feb. 21, 2022]. Retrieved from the Internet <https://arxiv.org/pdf/2102.06979.pdf>., Feb. 13, 2021, 11 Pages.
Fan, Bin et al., "Inverting a Rolling Shutter Camera: Bring Rolling Shutter Images to High Framerate Global Shutter Video", IEEE/CVF International Conference on Computer Vision [retrieved Feb. 21, 2022]. Retrieved from the Internet <https://openaccess.thecvf.com/content/ICCV2021/papers/Fan_Inverting_a_Rolling_Shutter_Camera_Bring_Rolling_Shutter_Images_to_ICCV_2021_paper.pdf>., 2021, 10 Pages.
Feng, Runsen et al., "Versatile Learned Video Compression", Cornell University arXiv, arXiv.org [retrieved Feb. 21, 2022]. Retrieved from the Internet <https://arxiv.org/pdf/2111.03386.pdf>., Jan. 5, 2022, 14 Pages.
Gui, Shurui et al., "FeatureFlow: Robust Video Interpolation via Structure-to-Texture Generation", IEEE/CVF [retrieved Feb. 21, 2022]. Retrieved from the Internet <https://openaccess.thecvf.com/content_CVPR_2020/papers/Gui_FeatureFlow_Robust_Video_Interpolation_via_Structure-to-Texture_Generation_CVPR_2020_paper.pdf?ref=https://githubhelp.com>., 2020, 10 Pages.
Ha, Taehyeun et al., "Motion Compensated Frame Interpolation by new Block-based Motion Estimation Algorithm", IEEE Transactions on Consumer Electronics vol. 50, No. 2 [retrieved May 17, 2022]. Retrieved from the Internet <https://doi.org/10.1109/TCE.2004.1309458>., May 1, 2004, 8 pages.
He, Kaiming et al., "Delving Deep into Rectifiers: Surpassing Human-Level Performance on ImageNet Classification", IEEE International Conference on Computer Vision [retrieved Feb. 21, 2022]. Retrieved from the Internet <http://cv.znu.ac.ir/afsharchim/DeepL/paper/kiaming.pdf>., Feb. 6, 2015, 11 Pages.
Herbst, Evan et al., "Occlusion Reasoning for Temporal Interpolation using Optical Flow", University of Washington Computer Science Department [retrieved Feb. 21, 2022]. Retrieved from the Internet <https://www.microsoft.com/en-us/research/wp-content/uploads/2009/08/UW-CSE-09-08-01.pdf>., Jul. 29, 2009, 41 Pages.
Holynski, Aleksander et al., "Animating Pictures with Eulerian Motion Fields", Cornell University arXiv, arXiv.org [retrieved Feb. 22, 2022]. Retrieved from the Internet <https://arxiv.org/pdf/2011.15128.pdf>., Nov. 30, 2020, 10 Pages.
Huang, Ai-Mei et al., "Correlation-Based Motion Vector Processing With Adaptive Interpolation Scheme for Motion-Compensated Frame Interpolation", IEEE Transactions on Image Processing [retrieved Feb. 22, 2022]. Retrieved from the Internet <http://citeseerx.ist.psu.edu/viewdoc/download?doi=10.1.1.468.525&rep=rep1&type=pdf>., Mar. 10, 2009, 13 Pages.
Huang, Zhewei et al., "RIFE: Real-Time Intermediate Flow Estimation for Video Frame Interpolation", Cornell University arXiv, arXiv.org [retrieved Feb. 15, 2022]. Retrieved from the Internet <https://arxiv.org/pdf/2011.06294.pdf>., Nov. 17, 2021, 12 Pages.
Jaderberg, Max et al., "Spatial Transformer Networks", In Advances in neural information processing systems [retrieved Feb. 22, 2022]. Retrieved from the Internet <https://arxiv.org/pdf/1506.02025.pdf>., Feb. 4, 2016, 14 pages.
Jeong, Seong-Gyun et al., "Motion-Compensated Frame Interpolation Based on Multihypothesis Motion Estimation and Texture Optimization", IEEE Transactions on Image Processing vol. 22, No. 11 [retrieved May 17, 2022]. Retrieved from the Internet <https://doi.org/10.1109/TIP.2013.2274731>., Jul. 24, 2013, 13 pages.
Jiang, Huaizu et al., "Super SloMo: High Quality Estimation of Multiple Intermediate Frames for Video Interpolation", Cornell

(56) References Cited

OTHER PUBLICATIONS

University arXiv, arXiv.org [retrieved Feb. 15, 2022]. Retrieved from the Internet <https://arxiv.org/pdf/1712.00080.pdf>., Jul. 13, 2018, 12 Pages.

Kalluri, Tarun et al., "FLAVR: Flow-Agnostic Video Representations for Fast Frame Interpolation", Cornell University arXiv, arXiv.org [retrieved Feb. 15, 2022]. Retrieved from the Internet <https://arxiv.org/pdf/2012.08512.pdf>., Apr. 15, 2021, 15 Pages.

Kim, Soo Ye, "FISR: Dee Joint Frame Interpolation and Super-Resolution with a Multi-Scale Temporal Loss", Proceedings of the AAAI Conference on Artificial Intelligence, vol. 34, No. 7 [retrieved Feb. 22, 2022]. Retrieved from the Internet <https://ojs.aaai.org/index.php/AAAI/article/view/6788>., Apr. 3, 2020, 9 Pages.

Kim, Soo Ye et al., "FISR: Deep Joint Frame Interpolation and Super-Resolution With a Multi-Scale Temporal Loss", Proceedings of the AAAI Conference on Artificial Intelligence vol. 34, No. 7 [retrieved Feb. 22, 2022]. Retrieved from the Internet <https://ojs.aaai.org/index.php/AAAI/article/view/6788>., Apr. 3, 2020, 9 Pages.

Kolda, Tamara et al., "Tensor Decompositions and Applications", SIAM Review vol. 51, No. 3 [retrieved Feb. 15, 2022]. Retrieved from the Internet <https://www.cs.umd.edu/class/fall2018/cmsc498V/slides/TensorBasics.pdf>., 2009, 46 Pages.

Kroeger, Till et al., "Fast Optical Flow using Dense Inverse Search", Cornell University arXiv, arXiv.org [retrieved Feb. 15, 2022]. Retrieved from the Internet <https://arxiv.org/pdf/1603.03590.pdf>., Mar. 11, 2016, 25 Pages.

Lee, Hyeongmin et al., "AdaCoF: Adaptive Collaboration of Flows for Video Frame Interpolation", Cornell University arXiv, arXiv.org [retrieved Feb. 15, 2022]. Retrieved from the Internet <https://arxiv.org/pdf/1907.10244.pdf>., Mar. 8, 2020, 10 Pages.

Li, Haopeng et al., "Video Frame Interpolation via Residue Refinement", IEEE International Conference on Acoustics, Speech and Signal Processing (ICASSP) [retrieved Feb. 16, 2022]. Retrieved from the Internet <http://crabwq.github.io/pdf/2020%20Video%20Frame%20Interpolation%20via%20Residue%20Refinement.pdf>., May 2020, 5 Pages.

Li, Zhengqi et al., "Neural Scene Flow Fields for Space-Time View Synthesis of Dynamic Scenes", Cornell University arXiv, arXiv.org [retrieved Feb. 22, 2022]. Retrieved from the Internet <https://arxiv.org/pdf/2011.13084.pdf>., Apr. 21, 2021, 11 Pages.

Lin, Songnan et al., "Learning Event-Driven Video Deblurring and Interpolation", European Conference on Computer Vision [retrieved Feb. 22, 2022]. Retrieved from the Internet <http://www.ecva.net/papers/eccv_2020/papers_ECCV/papers/123530681.pdf>., Nov. 2020, 16 Pages.

Liu, Yihao et al., "Enhanced Quadratic Video Interpolation", Cornell University arXiv, arXiv.org [retrieved Feb. 16, 2022]. Retrieved from the Internet <https://arxiv.org/pdf/2009.04642.pdf>., Sep. 10, 2020, 16 Pages.

Liu, Yu-Lun et al., "Deep Video Frame Interpolation Using Cyclic Frame Generation", Proceedings of the AAAI Conference on Artificial Intelligence vol. 33, No. 1 [retrieved Feb. 23, 2022]. Retrieved from the Internet <https://ojs.aaai.org/index.php/AAAI/article/view/4905>., Jul. 17, 2019, 9 Pages.

Liu, Ziwei et al., "Video Frame Synthesis Using Deep Voxel Flow", Cornell University arXiv, arXiv.org [retrieved Feb. 16, 2022]. Retrieved from the Internet <https://arxiv.org/pdf/1702.02463.pdf>., Aug. 5, 2017, 9 Pages.

Loshchilov, Ilya et al., "Fixing Weight Decay Regularization in Adam", ICLR 2018 Conference Blind Submission [retrieved Feb. 16, 2022]. Retrieved from the Internet <https://openreview.net/pdf?id=rk6qdGgCZ>., Feb. 15, 2018, 14 Pages.

Luo, Kunming et al., "UPFlow: Upsampling Pyramid for Unsupervised Optical Flow Learning", Cornell University arXiv, arXiv.org [retrieved Feb. 23, 2022]. Retrieved from the Internet <https://arxiv.org/pdf/2012.00212.pdf>., Jun. 2, 2021, 10 Pages.

Mahajan, Dhruv et al., "Moving gradients: a path-based method for plausible image interpolation", ACM Transactions on Graphics vol. 28, No. 3 [retrieved Feb. 23, 2022]. Retrieved from the Internet <http://citeseerx.ist.psu.edu/viewdoc/download?doi=10.1.1.437.2373&rep=rep1&type=pdf>., Jul. 27, 2009, 10 Pages.

Meister, Simon et al., "UnFlow: Unsupervised Learning of Optical Flow with a Bidirectional Census Loss", Cornell University arXiv, arXiv.org [retrieved Feb. 16, 2022]. Retrieved from the Internet <https://arxiv.org/pdf/1711.07837.pdf>., Nov. 21, 2017, 9 Pages.

Meyer, Simone et al., "Deep Video Color Propagation", Cornell University arXiv, arXiv.org [retrieved Feb. 16, 2022]. Retrieved from the Internet <https://arxiv.org/pdf/1808.03232.pdf>., Aug. 9, 2018, 15 Pages.

Meyer, Simone et al., "Phase-Based Frame Interpolation for Video", IEEE Conference on Computer Vision and Pattern Recognition (CVPR) [retrieved Feb. 16, 2022]. Retrieved from the Internet <http://citeseerx.ist.psu.edu/viewdoc/download?doi=10.1.1.929.6360&rep=rep1&type=pdf>., 2015, 9 Pages.

Meyer, Simone et al., "PhaseNet for Video Frame Interpolation", IEEE Conference on Computer Vision and Pattern Recognition (CVPR) [retrieved Feb. 16, 2022]. Retrieved from the Internet <https://openaccess.thecvf.com/content_cvpr_2018/CameraReady/1790.pdf>., 2018, 10 Pages.

Nguyen-Phuoc, Thu H. et al., "RenderNet: A deep convolutional network for differentiable rendering from 3D shapes", Cornell University arXiv, arXiv.org [retrieved Feb. 23, 2022]. Retrieved from the Internet <https://arxiv.org/pdf/1806.06575.pdf>., Apr. 1, 2019, 17 Pages.

Niklaus, Simon et al., "Context-Aware Synthesis for Video Frame Interpolation", Cornell University arXiv, arXiv.org [retrieved Feb. 16, 2022]. Retrieved from the Internet <https://arxiv.org/pdf/1803.10967.pdf>., Mar. 29, 2018, 10 Pages.

Niklaus, Simon et al., "Learned Dual-View Reflection Removal", Cornell University arXiv, arXiv.org [retrieved Feb. 24, 2022]. Retrieved from the Internet <https://arxiv.org/pdf/2010.00702.pdf>., Oct. 1, 2020, 10 Pages.

Niklaus, Simon et al., "Revisiting Adaptive Convolutions for Video Frame Interpolation", Cornell University arXiv, arXiv.org [retrieved Feb. 16, 2022]. Retrieved from the Internet <https://arxiv.org/pdf/2011.01280.pdf>., Nov. 2, 2020, 11 Pages.

Niklaus, Simon et al., "Softmax Splatting for Video Frame Interpolation", Cornell University arXiv, arXiv.org [retrieved Feb. 16, 2022]. Retrieved from the Internet <https://arxiv.org/pdf/2003.05534.pdf>., Mar. 11, 2020, 10 Pages.

Niklaus, Simon et al., "Video Frame Interpolation via Adaptive Convolution", Cornell University arXiv, arXiv.org [retrieved Feb. 16, 2022]. Retrieved from the Internet <https://arxiv.org/pdf/1703.07514.pdf>., Mar. 22, 2017, 10 Pages.

Niklaus, Simon et al., "Video Frame Interpolation via Adaptive Separable Convolution", Cornell University arXiv, arXiv.org [retrieved Feb. 16, 2022]. Retrieved from the Internet <https://arxiv.org/pdf/1708.01692.pdf>., Aug. 5, 2017, 10 Pages.

Paliwal, Avinash et al., "Deep Slow Motion Video Reconstruction with Hybrid Imaging System", Cornell University arXiv, arXiv.org [retrieved Feb. 23, 2022]. Retrieved from the Internet <https://arxiv.org/pdf/2002.12106.pdf>., Apr. 2, 2020, 12 Pages.

Park, Junheum et al., "Asymmetric Bilateral Motion Estimation for Video Frame Interpolation", Cornell University arXiv, arXiv.org [retrieved Feb. 16, 2022]. Retrieved from the Internet <https://arxiv.org/pdf/2108.06815.pdf>., Aug. 15, 2021, 10 Pages.

Park, Junheum et al., "BMBC: Bilateral Motion Estimation with Bilateral Cost Volume for Video Interpolation", Cornell University arXiv, arXiv.org [retrieved Feb. 16, 2022]. Retrieved from the Internet <https://arxiv.org/pdf/2007.12622.pdf>., Jul. 17, 2020, 16 Pages.

Peleg, Tomer et al., "IM-Net for High Resolution Video Frame Interpolation", IEEE/CVF Conference on Computer Vision and Pattern Recognition [retrieved Feb. 16, 2022]. Retrieved from the Internet <https://openaccess.thecvf.com/content_CVPR_2019/papers/Peleg_IM-Net_for_High_Resolution_Video_Frame_Interpolation_CVPR_2019_paper.pdf>., 2019, 10 Pages.

Phan, Anh-Huy et al., "Stable Low-Rank Tensor Decomposition for Compression of Convolutional Neural Network", Cornell University arXiv, arXiv.org [retrieved Feb. 16, 2022]. Retrieved from the Internet <https://arxiv.org/pdf/2008.05441.pdf>., Aug. 12, 2020, 18 Pages.

(56) References Cited

OTHER PUBLICATIONS

Reda, Fitsum A. et al., "Unsupervised Video Interpolation Using Cycle Consistency", Cornell University arXiv, arXiv.org [retrieved Feb. 16, 2022]. Retrieved from the Internet <https://arxiv.org/abs/1906.05928>., Mar. 28, 2021, 10 Pages.

Roberts, Richard et al., "Learning general optical flow subspaces for egomotion estimation and detection of motion anomalies", IEEE Conference on Computer Vision and Pattern Recognition [retrieved Feb. 16, 2022]. Retrieved from the Internet <https://projet.liris.cnrs.fr/imagine/pub/proceedings/CVPR-2009/data/papers/2129.pdf>., 2009, 8 Pages.

Sevilla-Lara, Laura et al., "Optical Flow With Semantic Segmentation and Localized Layers", Cornell University arXiv, arXiv.org [retrieved Feb. 16, 2022]. Retrieved from the Internet <https://arxiv.org/pdf/1603.03911.pdf>., Apr. 11, 2016, 10 Pages.

Shade, Jonathon et al., "Layered Depth Images", ACM 1998, the 25th annual conference on computer graphics and interactive techniques [retrieved Feb. 23, 2022]. Retrieved from the Internet <http://citeseerx.ist.psu.edu/viewdoc/download?doi=10.1.1.1004.2001&rep=rep1&type=pdf>., Jul. 24, 1998, 13 Pages.

Shen, Wang et al., "Blurry Video Frame Interpolation", Cornell University arXiv, arXiv.org [retrieved Feb. 23, 2022]. Retrieved from the Internet <https://arxiv.org/pdf/2002.12259.pdf>., Feb. 27, 2020, 10 Pages.

Shi, Zhihao et al., "Video Interpolation via Generalized Deformable Convolution", Cornell University arXiv, arXiv.org [retrieved Feb. 23, 2022]. Retrieved from the Internet <https://arxiv.org/pdf/2008.10680.pdf>., Mar. 18, 2021, 13 Pages.

Sim, Hyeonjun et al., "XVFI: eXtreme Video Frame Interpolation", Cornell University arXiv, arXiv.org [retrieved Feb. 16, 2022]. Retrieved from the Internet <http://128.84.21.203/pdf/2103.16206>., Aug. 5, 2021, 18 Pages.

Siyao, Li et al., "Deep Animation Video Interpolation in the Wild", Cornell University arXiv, arXiv.org [retrieved Feb. 16, 2022]. Retrieved from the Internet <https://arxiv.org/pdf/2104.02495.pdf>., Apr. 6, 2021, 9 Pages.

Soomro, Khurram et al., "UCF101: A Dataset of 101 Human Actions Classes From Videos in the Wild", Cornell University arXiv, arXiv.org [retrieved Feb. 16, 2022]. Retrieved from the Internet <https://arxiv.org/pdf/1212.0402.pdf>., Dec. 3, 2012, 7 Pages.

Sun, Deqing et al., "PWC-Net: CNNs for Optical Flow Using Pyramid, Warping, and Cost Volume", Cornell University arXiv, arXiv.org [retrieved Feb. 16, 2022]. Retrieved from the Internet <http://arxiv-export-lb.library.cornell.edu/pdf/1709.02371>., Jun. 25, 2018, 18 Pages.

Tang, Chengzhou et al., "LSM: Learning Subspace Minimization for Low-Level Vision", Cornell University arXiv, arXiv.org [retrieved Feb. 16, 2022]. Retrieved from the Internet <https://arxiv.org/pdf/2004.09197.pdf>., Apr. 20, 2020, 13 Pages.

Teed, Zachary et al., "RAFT: Recurrent All-Pairs Field Transforms for Optical Flow", Cornell University arXiv, arXiv.org [retrieved Feb. 23, 2022]. Retrieved from the Internet <https://arxiv.org/pdf/2003.12039.pdf>., Aug. 25, 2020, 21 Pages.

Tulyakov, Stepan et al., "TimeLens: Event-based Video Frame Interpolation", Cornell University arXiv, arXiv.org [retrieved Feb. 16, 2022]. Retrieved from the Internet <https://arxiv.org/pdf/2106.07286.pdf>., Jun. 14, 2021, 14 Pages.

Wang, Yang et al., "GIF2Video: Color Dequantization and Temporal Interpolation of GIF Images", Cornell University arXiv, arXiv.org [retrieved Feb. 23, 2022]. Retrieved from the Internet <https://arxiv.org/pdf/1901.02840.pdf>., Apr. 8, 2019, 10 Pages.

Wang, Zihao W et al., "Event-driven Video Frame Synthesis", Cornell University arXiv, arXiv.org [retrieved Feb. 23, 2022]. Retrieved from the Internet <https://arxiv.org/pdf/1902.09680.pdf>., Jul. 6, 2019, 10 Pages.

Wu, Chao-Yuan et al., "Video Compression through Image Interpolation", Cornell University arXiv, arXiv.org [retrieved Feb. 16, 2022]. Retrieved from the Internet <https://arxiv.org/pdf/1804.06919.pdf>., Apr. 18, 2018, 18 Pages.

Xiang, Xiaoyu et al., "Zooming Slow-Mo: Fast and Accurate One-Stage Space-Time Video Super-Resolution", Cornell University arXiv, arXiv.org [retrieved Feb. 23, 2022]. Retrieved from the Internet <https://arxiv.org/pdf/2002.11616.pdf>., Feb. 26, 2020, 12 Pages.

Xu, Xiangyu et al., "Quadratic video interpolation", Cornell University arXiv, arXiv.org [retrieved Feb. 23, 2022]. Retrieved from the Internet <https://arxiv.org/pdf/1911.00627.pdf>., Nov. 2, 2019, 10 Pages.

Xue, Tianfan et al., "Video Enhancement with Task-Oriented Flow", Cornell University arXiv, arXiv.org [retrieved Feb. 16, 2022]. Retrieved from the Internet <https://arxiv.org/pdf/1711.09078.pdf>., Nov. 10, 2019, 20 Pages.

Yu, Zhiyang et al., "Training Weakly Supervised Video Frame Interpolation With Events", IEEE/CVF International Conference on Computer Vision (ICCV) [retrieved Feb. 16, 2022]. Retrieved from the Internet <https://openaccess.thecvf.com/content/ICCV2021/papers/Yu_Training_Weakly_Supervised_Video_Frame_Interpolation_With_Events_ICCV_2021_paper.pdf>., Oct. 2021, 10 Pages.

Yuan, Liangzhe et al., "Zoom-In-To-Check: Boosting Video Interpolation via Instance-Level Discrimination", Cornell University arXiv, arXiv.org [retrieved Feb. 16, 2022]. Retrieved from the Internet <https://arxiv.org/pdf/1812.01210.pdf>., Apr. 28, 2019, 9 Pages.

Zhang, Haoxian et al., "A Flexible Recurrent Residual Pyramid Network for Video Frame Interpolation", Computer Vision—ECCV [retrieved Feb. 16, 2022]. Retrieved from the Internet <http://www.ecva.net/papers/eccv_2020/papers_ECCV/papers/123700477.pdf>., Nov. 2020, 17 Pages.

Zhang, Shipeng et al., "Learning Tensor Low-Rank Prior for Hyperspectral Image Reconstruction", IEEE CCVPR [retrieved Feb. 16, 2022]. Retrieved from the Internet <https://openaccess.thecvf.com/content/CVPR2021/papers/Zhang_Learning_Tensor_Low-Rank_Prior_for_Hyperspectral_Image_Reconstruction_CVPR_2021_paper.pdf?ref=https://githubhelp.com>., Jun. 2021, 10 Pages.

Zhang, Youjian et al., "Video Frame Interpolation without Temporal Priors", Cornell University arXiv, arXiv.org [retrieved Feb. 16, 2022]. Retrieved from the Internet <https://arxiv.org/pdf/2112.01161.pdf>., Dec. 2, 2021, 11 Pages.

Zhao, Lili et al., "RAI-Net: Range-Adaptive LiDAR Point Cloud Frame Interpolation Network", Cornell University arXiv, arXiv.org [retrieved Feb. 23, 2022]. Retrieved from the Internet <https://arxiv.org/pdf/2106.00496.pdf>., Jun. 1, 2021, 6 Pages.

Zitnick, C et al., "High-quality Video View Interpolation Using a Layered Representation", ACM Transactions on Graphics vol. 23, No. 3 [retrieved Feb. 23, 2022]. Retrieved from the Internet <https://www.microsoft.com/en-us/research/wp-content/uploads/2016/02/ZitnickSig04.pdf>., Aug. 2004, 9 pages.

* cited by examiner

MANY-TO-MANY SPLATTING-BASED DIGITAL IMAGE SYNTHESIS

BACKGROUND

Digital image synthesis techniques are employed by computing devices to synthesize a digital image from another digital image. These techniques are used in a variety of scenarios, examples of which include animation "inbetweening," video compression, video editing, motion blur synthesis, and so forth. Another common example involves synthesizing the digital image as a frame disposed "between" two other frames in a sequence, e.g., to form a digital video or animation having a plurality of frames.

Early conventional techniques to do so involve use of block motion estimation and compensation using performance constraints, which provide inconsistent results. Graphics accelerators were then developed to provide sufficient computational resources in support of dense motion estimation and compensation. As such, this typically involves heavy use of neural networks and a corresponding heavy use of computational resources used to implement these techniques. For example, conventional frame interpolation approaches that employ deep learning involve fully executing an entirety of a neural network for each output frame in order to resolve visual artifacts in the synthesized digital images caused by occlusions, discontinuities, and so on. As such, these techniques become unwieldly in instances involving multiple frames, frames that have a high resolution, and so forth. Accordingly, execution of conventional techniques by computing devices becomes untenable in common usage scenarios due to this resource consumption.

SUMMARY

Digital synthesis techniques are described to synthesize a digital image at a target time between a first digital image and a second digital image. To begin, an optical flow generation module is employed to generate optical flows. The digital images and optical flows are then received as an input by a motion refinement system. The motion refinement system is configured to generate data describing many-to-many relationships mapped for pixels in the plurality of digital images and reliability scores of the many-to-many relationships. The reliability scores are then used to resolve overlaps of pixels that are mapped to a same location by a synthesis module to generate a synthesized digital image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
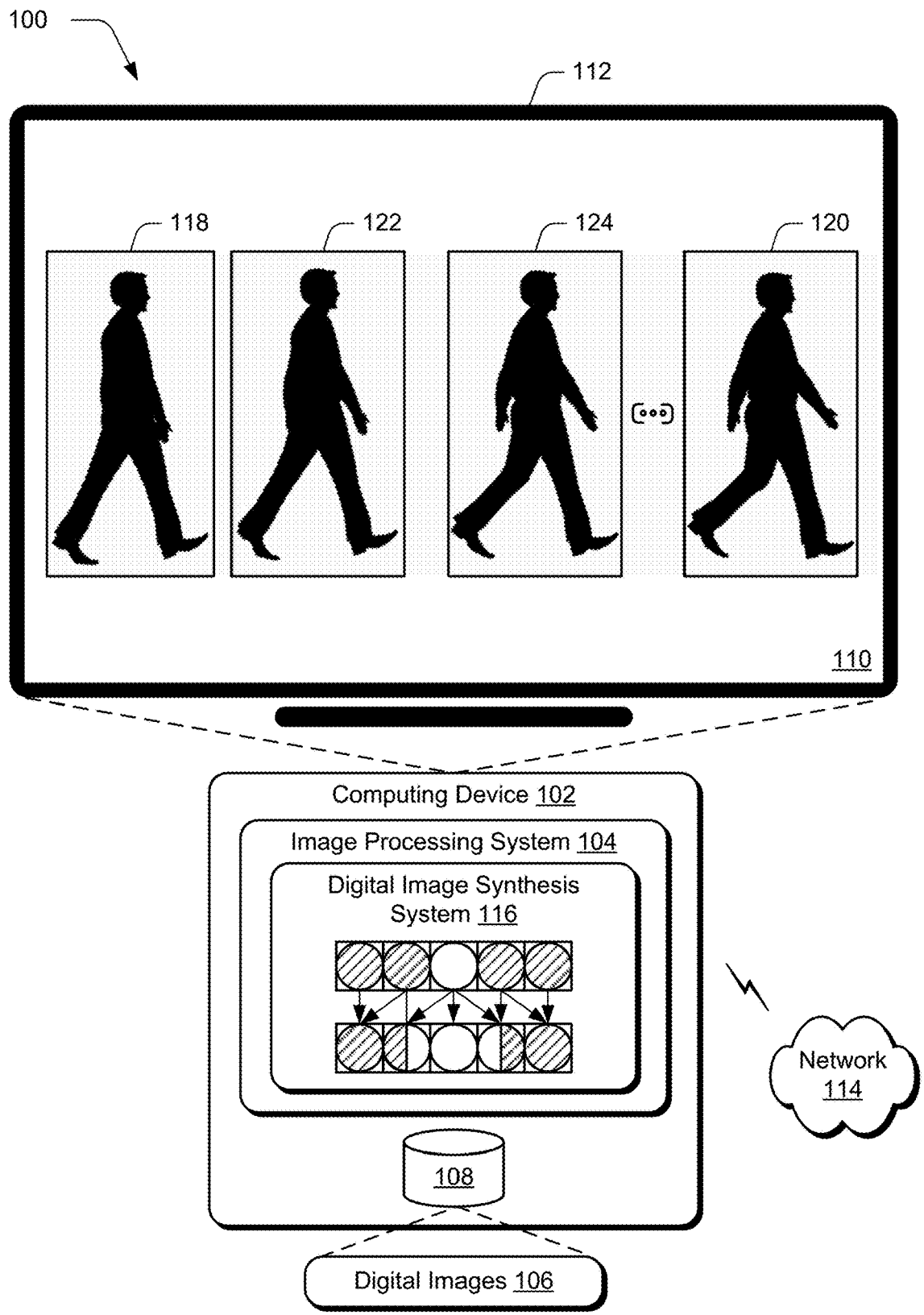
FIG. 1 is an illustration of an environment in an example implementation that is operable to employ many-to-many splatting-based digital image synthesis techniques described herein.

Conventional digital image synthesis techniques are computationally-resource intensive. This is because conventional usage scenarios employ neural networks that are executed in their entirety in order to generate each instance of a digital image in order to resolve visual artifacts. Consequently, these conventional techniques consume significant amounts of computational resources and are ill suited for repeated implementation using typical computing devices.

Accordingly, digital image synthesis techniques are described that leverage many-to-many splatting (i.e., forward warping) in which pixels are forward warped to a plurality of locations in order to synthesize a digital image. These techniques overcome technical limitations of conventional techniques and improve visual accuracy resulting in improved operation of computing devices that implement these techniques. The many-to-many splatting techniques, for instance, support improved accuracy and as such avoid limitations of conventional techniques that involve use of neural networks to resolve visual artifacts.

In one example, the digital synthesis techniques are used to synthesize a digital image at a target time between a first digital image and a second digital image. A digital image synthesis system, for instance, receives input digital images as well as an input identifying a target time input "t" defining a point in time in the movement of pixels between the first and second digital images, e.g., at a point in time halfway between the movement between the frames.

An optical flow generation module is then employed to generate optical flows. In a two-image bidirectional example, a first optical flow is generated that describes movement of pixels from the first digital image to the second digital image. A second optical flow is also generated that describes movement of pixels from the second digital image to the first digital image. Thus, the target time is a point in time with respect to these movements.

The digital images and optical flows are then received as an input by a motion refinement system. The motion refinement system is configured to generate data describing many-to-many relationships mapped for pixels in the plurality of digital images and reliability scores of the many-to-many relationships. The data describing the many-to-many relationships, for instance, is generated by the motion refinement system using many-to-many splatting which supports an ability to forward warp pixels of the input images to a plurality of locations.

The reliability scores are then used to resolve overlaps of pixels that are mapped to a same location, e.g., to weigh relative contributions. This provides increased flexibility in image synthesis by supporting an ability to map pixels from a source image to multiple locations based on multiple motion vectors for each pixel and then resolving conflicts based on the reliability scores. Further, the accuracy of this techniques supports an ability to avoid use of conventional neural networks to resolve visual artifacts, thereby improving computing device operation. Further discussion of these and other examples and advantages are included in the following sections and shown using corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Digital Image Synthesis Environment

FIG. 1 is an illustration of a digital medium digital image synthesis environment 100 in an example implementation that is operable to employ techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 9.

The computing device 102 is illustrated as including an image processing system 104. The image processing system 104 is implemented at least partially in hardware of the computing device 102 to process and transform a digital image 106, which is illustrated as maintained in storage 108 of the computing device 102. Such processing includes creation of the digital image 106, modification of the digital image 106, and rendering of the digital image 106 in a user interface 110 for output, e.g., by a display device 112. Although illustrated as implemented locally at the computing device 102, functionality of the image processing system 104 is also configurable as whole or part via functionality available via the network 114, such as part of a web service or "in the cloud."

An example of functionality incorporated by the image processing system 104 to process the image 106 is illustrated as a digital image synthesis system 116. The digital image synthesis system 116 is representative of functionality to synthesize a digital image 106 based on another digital image. Image synthesis techniques are employed in a wide range of usage scenarios, examples of which include animation "inbetweening," video compression, video editing, motion blur synthesis, and so forth. Another example involves automated synthesizing of the digital image as a frame disposed "between" two other frames in sequence, e.g., to form a digital video or animation having a plurality of frames.

In the illustrated implementation in the user interface 110, for instance, a first digital image 118 and a second digital image 120 are utilized as a basis by the digital image synthesis system 116 to synthesize a plurality of digital images, examples of which include a first synthesized digital image 122 and a second synthesized digital image 124. The first and second synthesized digital images 122, 124 correspond to target times relative to motion exhibited between the first and second digital images 118, 120, e.g., based on one or more optical flows generated from the images.

A variety of conventional techniques have been employed to support frame interpolation, however these techniques typically introduce visual artifacts, incur significant computational resource costs, and so on. Initial conventional examples are based on block-level motion estimates that include overlapping block motion compensation, adaptively handling overlapping blocks, detecting and handling occlusions, considering multiple motion estimates, and estimating a dense motion field at the interpolation instant. In another conventional example, motion compensation is based on dense estimates that includes layered warping, occlusion reasoning for temporal interpolation, warping with transition points, and using warping as a metric to evaluate optical flow.

Another conventional category of conventional frame interpolation approaches accepts two digital images as an input and interpolates a frame at a time between the inputs. Each of these conventional techniques, however, involve use of a neural network to infer the interpolation result at a desired instant. The conventional techniques either use a neural network to refine warped representations of the input images or use a neural network to infer the motion from the desired interpolation instant to the input images. Use of such neural networks, however, is computationally challenging, especially at high resolutions. This is in contrast to splatting-based synthesis techniques utilized by the digital image synthesis system 116 where, given optical flow estimates between digital images 106, an interpolation result (i.e., a synthesized digital image) is synthesized at a point in time by using relatively few primitive image operations that are computationally efficient.

To do so, the digital image synthesis system 116 employs a many-to-many (M2M) splatting framework that estimates multiple bidirectional flow fields and then efficiently forward warps the digital images 106 to the desired time step before fusing any overlapping pixels. The digital image synthesis system 116 is configured to directly operate on pixel colors. In an implementation, the digital image synthesis system 116 generates optical flows, which are bidirectional to extract the interframe motion between the two input digital images, e.g., at a coarse level. Based on this low-resolution optical flow estimate, the digital image synthesis system 116 predicts multiple flow vectors for each pixel at the full-resolution, which are then used to synthesize a digital image through many-to-many splatting. This is in contrast to conventional motion-based frame interpolation techniques that are limited to estimating a single inter-frame motion vector for each pixel.

Conventional techniques that involve forward warping typically result as many-to-one splatting of pixels from a source image to a synthesized digital image, leaving visual holes in the warped result. To overcome this limitation, the digital image synthesis system 116 is configured to support many-to-many relationships as illustrated in FIG. 1 among pixels by predicting multiple motion vectors for each of the input pixels, and then forward warping the pixels to multiple locations at a desired time step. Thus, many-to-many splatting supports complex interactions among pixels that are not possible in conventional techniques, i.e., each source pixel is permitted to influence multiple target pixels. As a result, each target pixel is synthesized with a larger area of visual context than is capable in conventional techniques. Further, the digital image synthesis system 116 employs a learning-based fusion strategy to merge overlapping pixels, which adaptively combines pixels that map to the same location based on reliability scores for the respective pixels from the source images. Because optical flow estimation predicts time-invariant correspondence estimates, it is performable for a single time for a given input digital image pair, thereby conserving computational resources and improving efficiency of underlying computing devices that implement these techniques.

Once many-to-many inter-frame motion has been established, the synthesized digital image is generated by warping and fusing the input digital images. This is in contrast to conventional approaches that leverage refinement networks. As such, the techniques described herein are performable by the digital image synthesis system 116 by an order of magnitude faster when compared with conventional techniques. Further discussion of these and other advantages is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Many-to-Many Splatting-Based Digital Image Synthesis

The following discussion describes many-to-many splatting-based digital image synthesis techniques that are implementable utilizing the previously described systems and devices. Aspects of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-7 and in parallel with a procedure 800 of FIG. 8.

Figure 2:
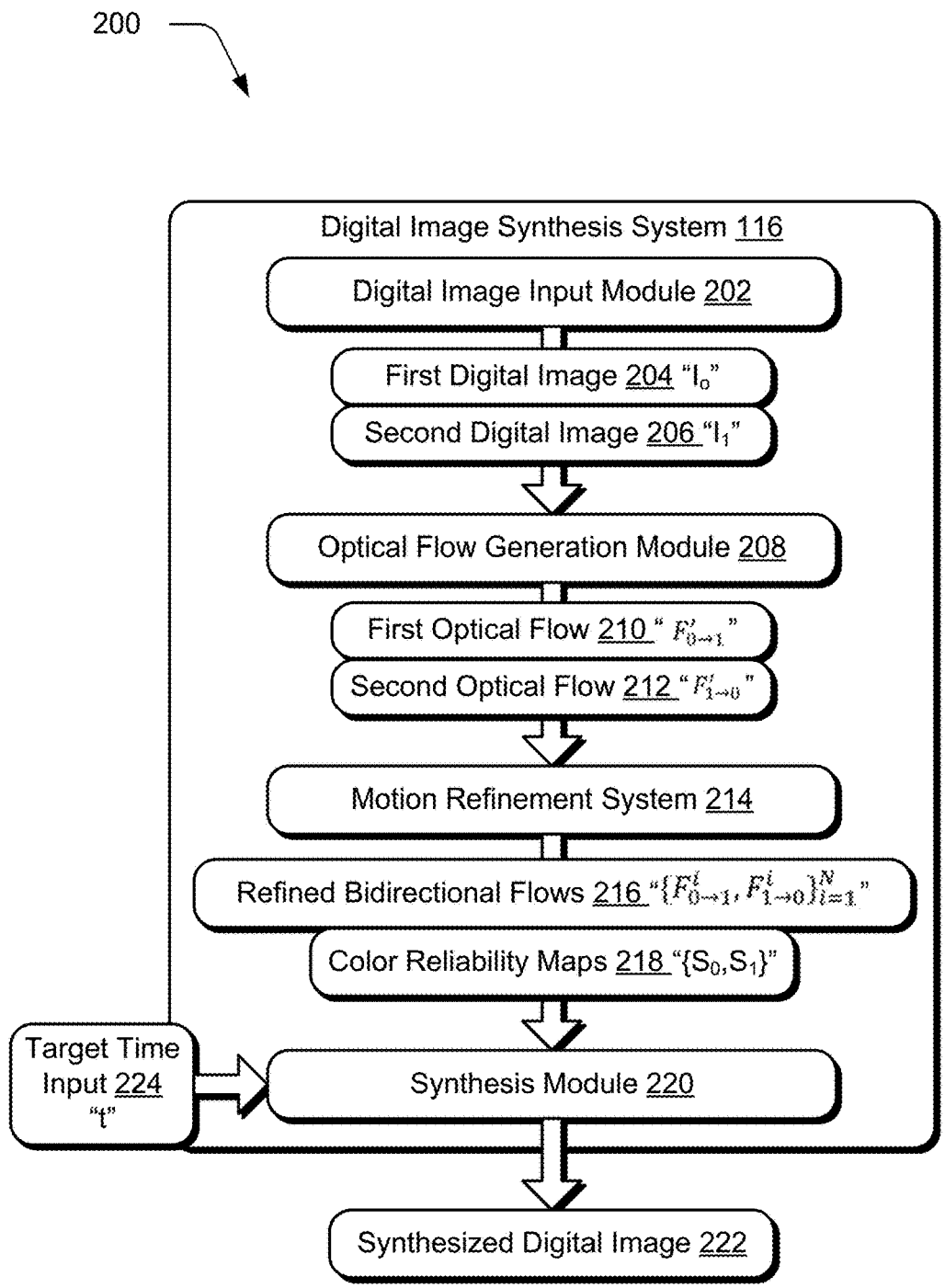
FIG. 2 depicts a system in an example implementation showing operation of a digital image synthesis system of FIG. 1 in greater detail as automatically synthesizing a digital image.

FIG. 2 depicts a procedure 200 in an example implementation showing operation of the digital image synthesis system 116 in greater detail as automatically synthesizing a digital image. The digital image synthesis system 116 includes a digital image input module 202 that is configured to receive an input specifying a plurality of digital images 106 (block 802). In the illustrated example, this includes a first digital image 204 "$I_0$," and a second digital image 206 "$I_1$," that are to be used as a basis to synthesize a digital image An optical flow generation module 208 is then utilized to produce optical flows (block 804) based on the first and second digital images 204, 206. In a two-image bidirectional example, the optical flow generation module 208 produces a first optical flow 210 "$F_{0 \to 1}$'" describing movement from the first digital image 204 "$I_0$" to the second digital image 206 "$I_1$." The optical flow generation module 208 also produces a second optical flow 212 "$F_{1 \to 0}$'" describing movement from the second digital image 206 "$I_1$" to the first digital image 204 "$I_0$." Optical flow is a pattern of apparent motion within a visual scene caused by relative motion between an observer and the scene. Techniques usable to estimate optical flow include phase correlation, block-based techniques, estimation of motion as instantaneous image velocities, differential techniques, variational techniques, discrete image displacements, discrete optimization techniques, gradient-based optical flow, and so forth.

The first digital image 204 "$I_0$," the second digital image 206 "$I_1$," the first optical flow 210 "$F_{0 \to 1}$',", and the second optical flow 212 "$F_{1 \to 0}$'" are received as an input by a motion refinement system 214. The motion refinement system 214 is configured to generate data describing many-to-many relationships mapped for pixels in the plurality of digital images to a time step based on the plurality of optical flows. The motion refinement system 214 is also configured to generate reliability scores of the many-to-many relationships, respectively (block 806) defining relative accuracy of the relationships. In the illustrated example, this data is represented as refined bidirectional flows 216 "$\{F_{0 \to 1}', F_{1 \to 0}'\}_{i=1}^{N}$" (e.g., as motion vectors) and color reliability maps 218 "$\{S_0, S_1\}$."

This data is then used as a basis by a synthesis module 220 to synthesize a digital image 222 (block 808) for a target time input "t" 224. The target time defines a relative amount of time with respect to movement between first and second digital frames, e.g., on a scale from zero to one. A target time of "0.5," for instance, defines a midway point in the movement between first and second digital images, e.g., frames. This is performed by forward warping pixels of the input digital images (e.g., the first digital image 204 "$I_0$" and the second digital image 206 "$I_1$,") and merging the pixels using a fusion technique that leverages the color reliability maps 218 "$\{S_0, S_1\}$" e.g., to resolve overlaps.

Figure 3:
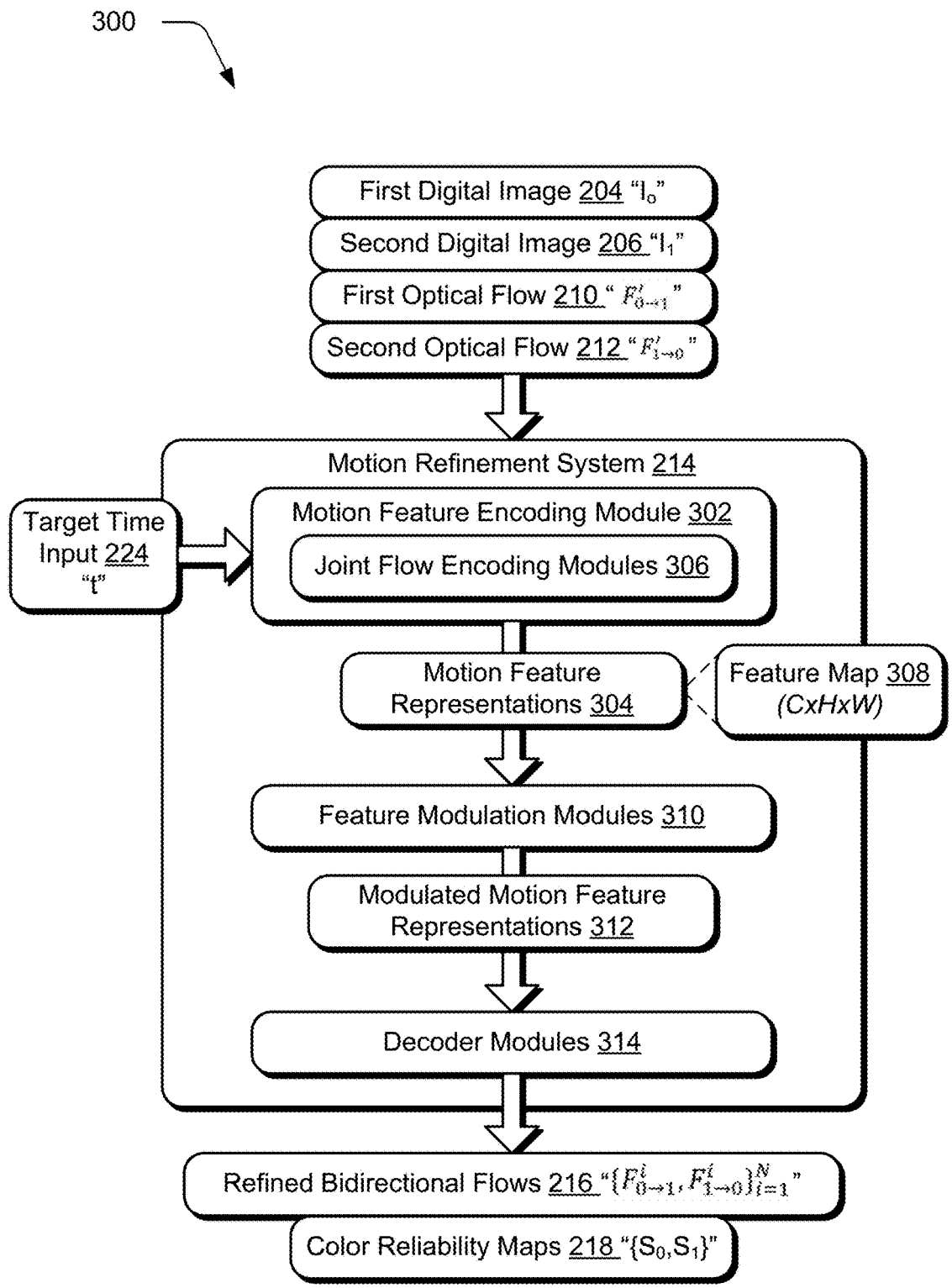
FIG. 3 depicts a system in an example implementation showing operation of a motion refinement system of FIG. 2 in greater detail.

FIG. 3 depicts a system 300 in an example implementation showing operation of the motion refinement system 214 of FIG. 2 in greater detail. Conventional optical flow models use a single motion vector for each pixel, thus limiting locations, to which, a pixel is forward warped. In practice, this causes visual artifacts referred to as "holes" that do not include colors from source digital images. Moreover, typical optical flow estimators are supervised with training data at a relatively low resolution, and therefore yield poor results when confronted with high-resolution digital images, e.g., HD, 4k, 8k and so forth.

Accordingly, the motion refinement system 214 is configured to support many-to-many splatting in which a plurality of motion vectors are predictable for pixels in a source image, e.g., the first digital image 204 and/or the second digital image 206. The motion refinement system 214 includes three parts, motion feature encoding modules 302, feature modulation modules 310, and decoder modules 314.

The motion feature encoding modules 302 are configured to encode motion feature representations 304 from the plurality of digital images and the plurality of optical flows (block 810). This is performed using joint flow encoding modules 306 to generate feature maps 308 by progressively generating motion feature pyramids based on the first and second optical flows 210, 212. The feature modulation modules 310 are then utilized to modulate the motion feature representations 304 using a low-rank constraint (block 812), thereby generating modulated motion feature representations 312. The decoder modules 314 then use machine learning to form the plurality of refined bidirectional flows 216 and color reliability maps 218 based on the modulated motion feature representations 312 (block 814).

Figure 4:
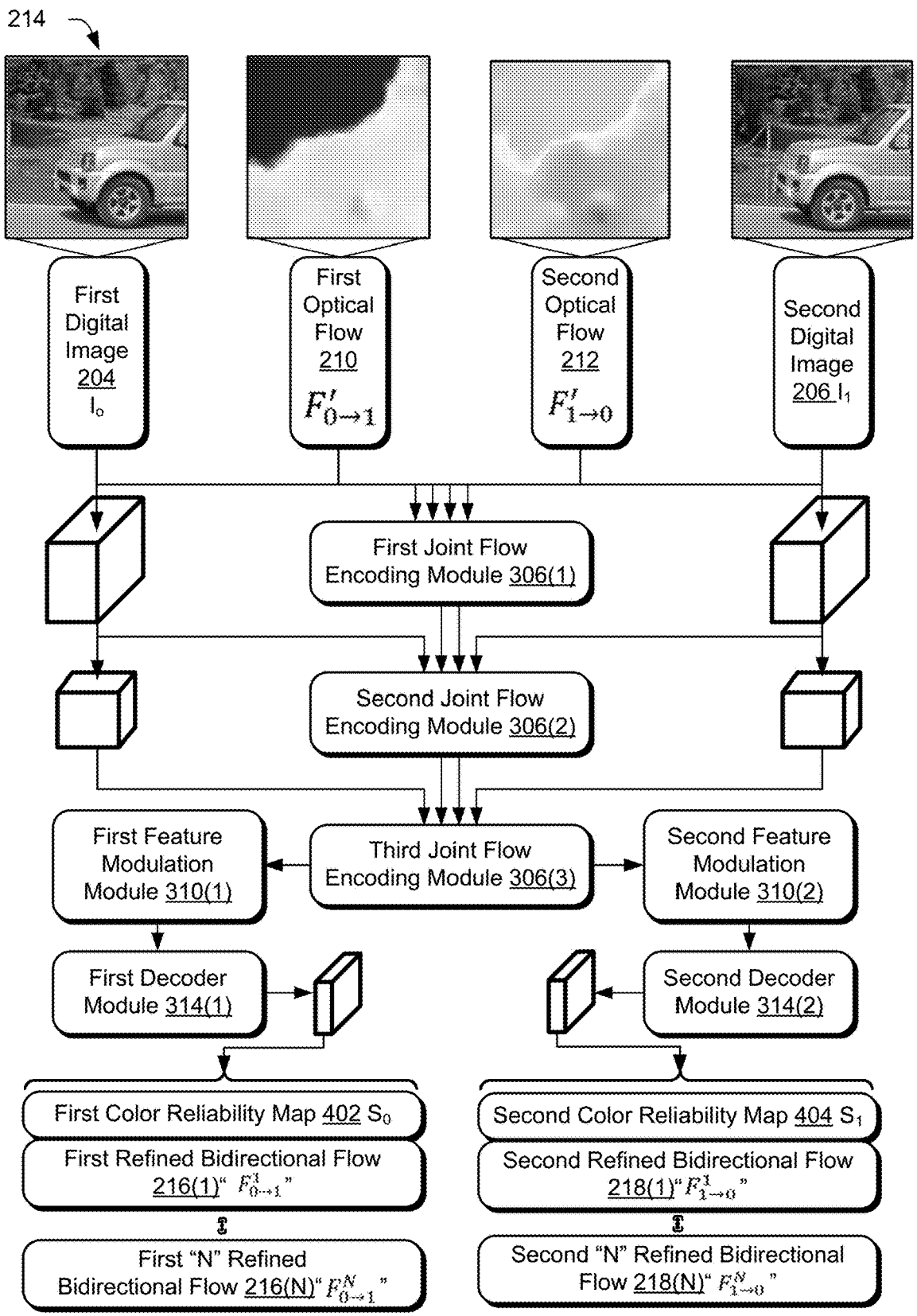
FIG. 4 depicts the motion refinement system of FIG. 3 in greater detail as performing progressive generation of motion feature representations as motion feature pyramids.

FIG. 4 depicts the motion refinement system 214 of FIG. 3 in greater detail as performing progressive generation of motion feature representations as motion feature pyramids. As before, the motion refinement system 214 receives the first digital image 204 "$I_0$," and the second digital image 206 "$I_1$." The motion refinement system 214 also receives the first optical flow 210 "$F_{0\rightarrow 1}'$" and the second optical flow 212 "$F_{1\rightarrow 0}'$." Examples of the first joint flow encoding modules 306 are illustrated as a first joint flow encoding module 306(1), a second joint flow encoding module 306(2), and a third joint flow encoding module 306(3). The feature modulation module is illustrated as implemented using a first feature modulation module 310(1) and a second feature modulation module 310(2). Likewise, the decoder module 314 is implemented using a first decoder module 314(1) and a second decoder module 314(2).

The first, second, and third joint flow encoding modules 306(1)-306(3) are configured to encode the motion feature representations 304 in a hierarchical manner in sequential stages using the digital images and optical flows. The first optical flow 210 "$F_{0\rightarrow 1}'$," and the second optical flow 212 "$F_{1\rightarrow 0}'$" are generated by the optical flow generation module 208 at a coarse resolution. At first, the two L-level image feature pyramids are extracted from the first and second digital images 204, 206 "$I_0$," "$I_1$" at the "zeroth-level" being the images themselves.

Figure 5:
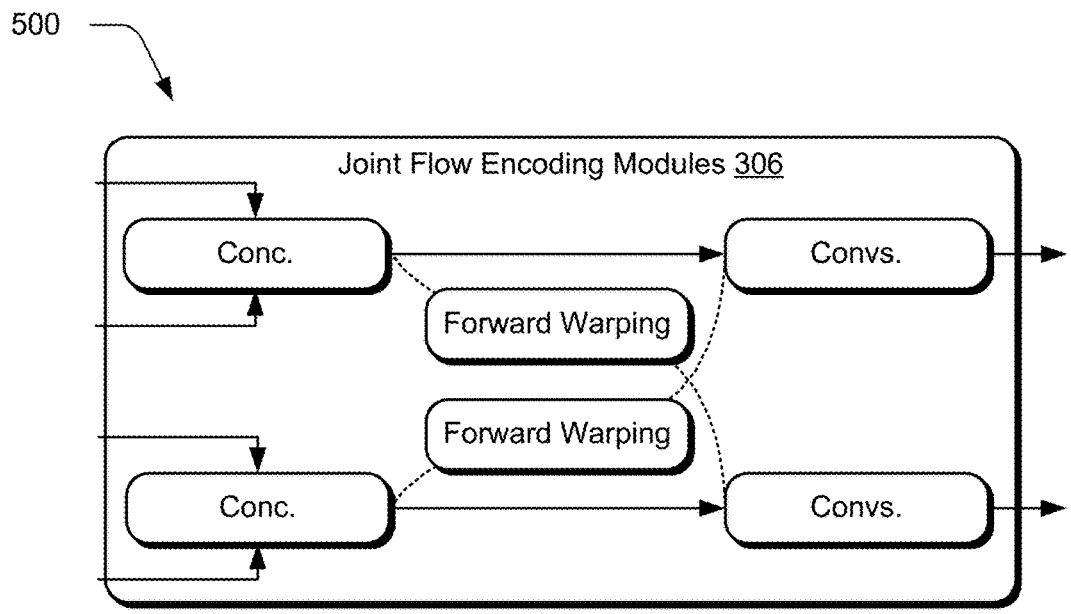
FIG. 5 depicts a system showing operation of joint flow encoding modules of FIG. 3 in greater detail.

FIG. 5 depicts a system 500 showing operation of the joint flow encoding modules 306 of FIG. 3 in greater detail. To generate the motion feature representations 304 at each pyramid level, two convolutional layers with intermittent PReLU activations are utilized to down sample features from a previous level by a factor of two. In an implementation, "L" is set equal to four and the numbers of feature channels from shallow to deep are 16, 32, 64, and 128 respectively. Then, from the zeroth to the last level, the first, second, and third joint flow encoding modules 306(1)-306(3) are used to progressively encode motion feature pyramids for bidirectional flow fields defined by the first and second optical flows 210, 212 "$F_{0\rightarrow 1}'$," "$F_{1\rightarrow 0}'$."

In the "l-th" level's joint flow encoding module, the motion and image features from the previous level are warped towards each other. Specifically, the features from the pyramid corresponding to the first digital image 204 "$I_0$," are warped towards the second digital image 206 "$I_1$" and vice versa using the first and second optical flows 210, 212. Then, the original features and the warped features are combined and downsampled using a two-layer convolutional neural network to encode the "l-th" level's motion feature representation.

The first and second feature modulation modules 310(1), 310(2) are designed to further enhance the motion feature representations with a low-rank constraint. Flow fields of natural dynamic scenes are highly structured due to the underlying physical constraints, which can be exploited by low-rank models to enhance the motion estimation quality. To avoid formulating explicit optimization objectives as performed in conventional techniques that are inefficient in some high-resolution applications, canonical polyadic (CP) decomposition is leveraged by the feature modulation modules as an efficient low-rank modulation to enhance each flow's feature maps with low-rank characteristics.

Figure 6:
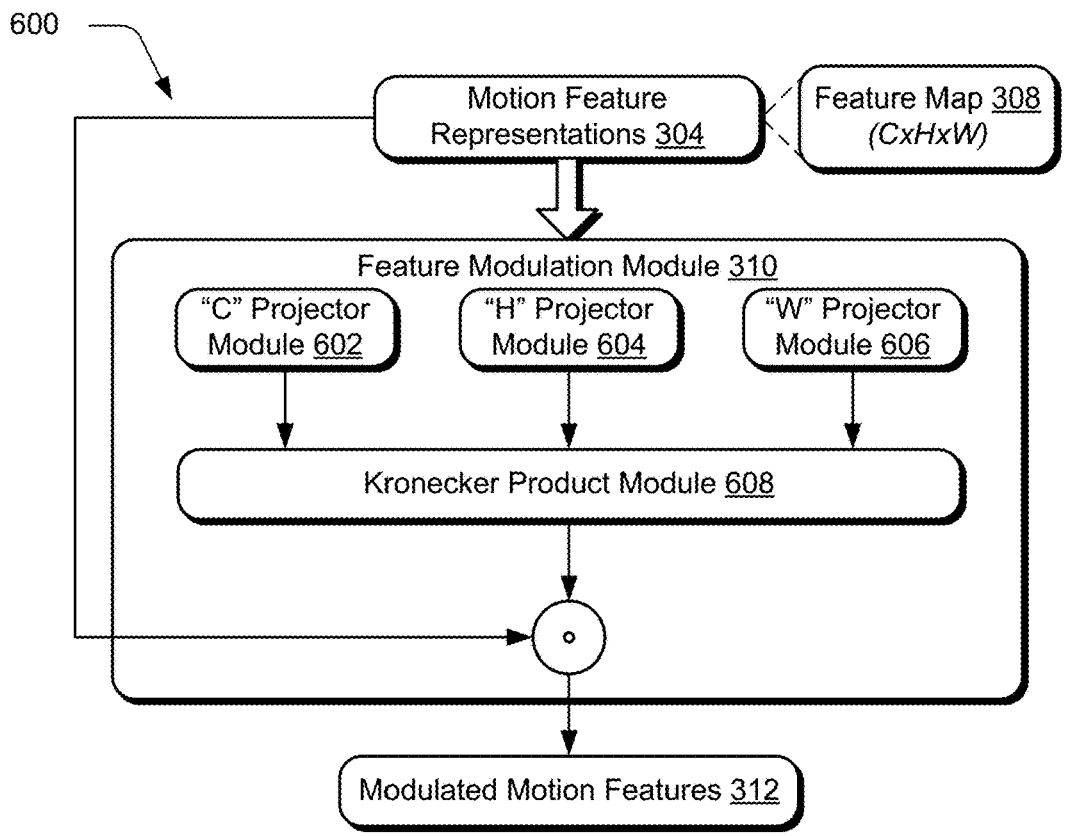
FIG. 6 depicts a system in an example implementation showing operation of a feature modulation module of FIG. 3 in greater detail.

FIG. 6 depicts a system 600 in an example implementation showing operation of the feature modulation module 310 of FIG. 3 in greater detail. Given motion feature representations 304 having an input feature map 308 of size "(C×H×w)", three groups of projectors are adopted to respectively shrink the feature maps into the channel, height, and width dimensions. Examples of these projectors are illustrated as a "C" projector module 602, "H" projector module 604, and a "W" projector module 606.

Each projector module includes a pooling layer, "1×1" convolutional layers, and a sigmoid function. "M" projectors are applied for each of the three dimensions which results in three groups of one-dimensional features, whose sizes can be represented as "M×(C×1×1)" for the channel dimension, "M (1×H×1)" for the height dimension, and "m×(1×1×W)" for the width dimension. Then, for each of the "M" vectors from the three dimensions, a Kronecker Product is applied by a Kronecker Product Module 608 to calculate a rank-1 tensor, whose shape is "C×H×W." The "M rank-1" tensors are later averaged pointwise. To ensure low-rank characteristic, "M" is set to be smaller than "C," "H," and "W," e.g., "M" equals sixteen. The input features and low-rank tensor are combined via pointwise multiplication, where the latter serves as weights to modulate the former with low-rank characteristics. Deep learning-based low-rank constraints are also usable for motion modeling.

Returning again to FIG. 4, the first and second decoder modules 314(1), 314(2) are configured to generate "N" motion vectors as well as the reliability scores for each input pixel based on the motion feature pyramids and the feature maps subject to the low-rank prior. In an implementation, deconvolutional layers are used to enlarge the spatial size of the modulated motion feature presentations 312. That is, the decoder modules 314 operate in "L" stages from coarse to fine while leveraging the features encoded by the joint flow encoding modules 306. At the last decoding stage, the full-resolution feature maps for the flow in each direction are converted into multiple fields and corresponding reliability maps. In FIG. 4, this is depicted as first and second color reliability maps 402, 404 "$\{S_0,S_1\}$" and corresponding "first through N" refined bidirectional flows 216(1)-216(N) "$(F_{0\rightarrow 1}^1\text{-}F_{0\rightarrow 1}^N)$" and "second through "N" refined bidirectional flows 218(1)-218(N) "$(F_{0\rightarrow 1}^1\text{-}F_{0\rightarrow 1}^N)$." This data describing the many-to-many relationships mapped for pixels in the plurality of digital images and the reliability scores are then passed to the synthesis module 220 to generate the synthesized digital image 222 for a particular target time input 224 "t."

Figure 7:
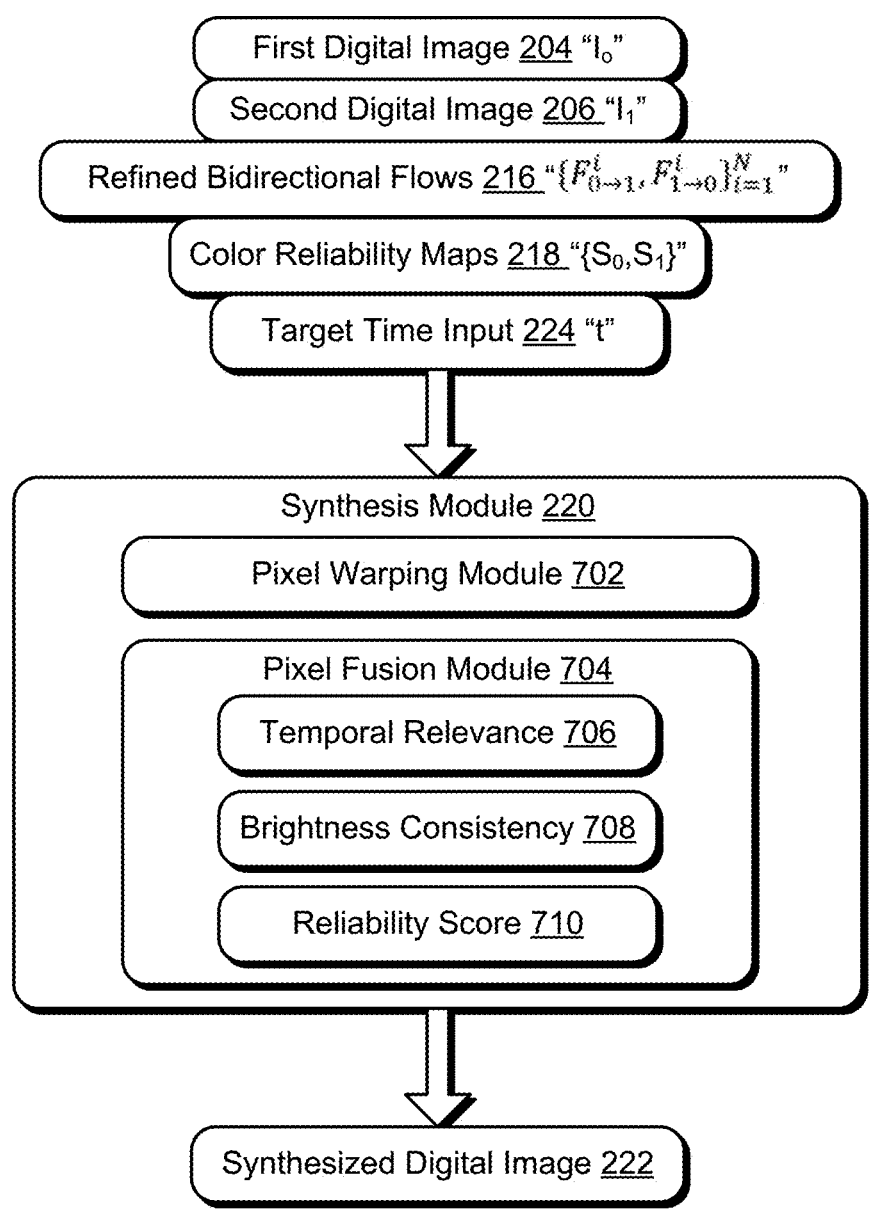
FIG. 7 depicts an example system showing operation of the synthesis module of FIG. 2 in greater detail as leveraging pixel waring and fusion.
Figure 8:
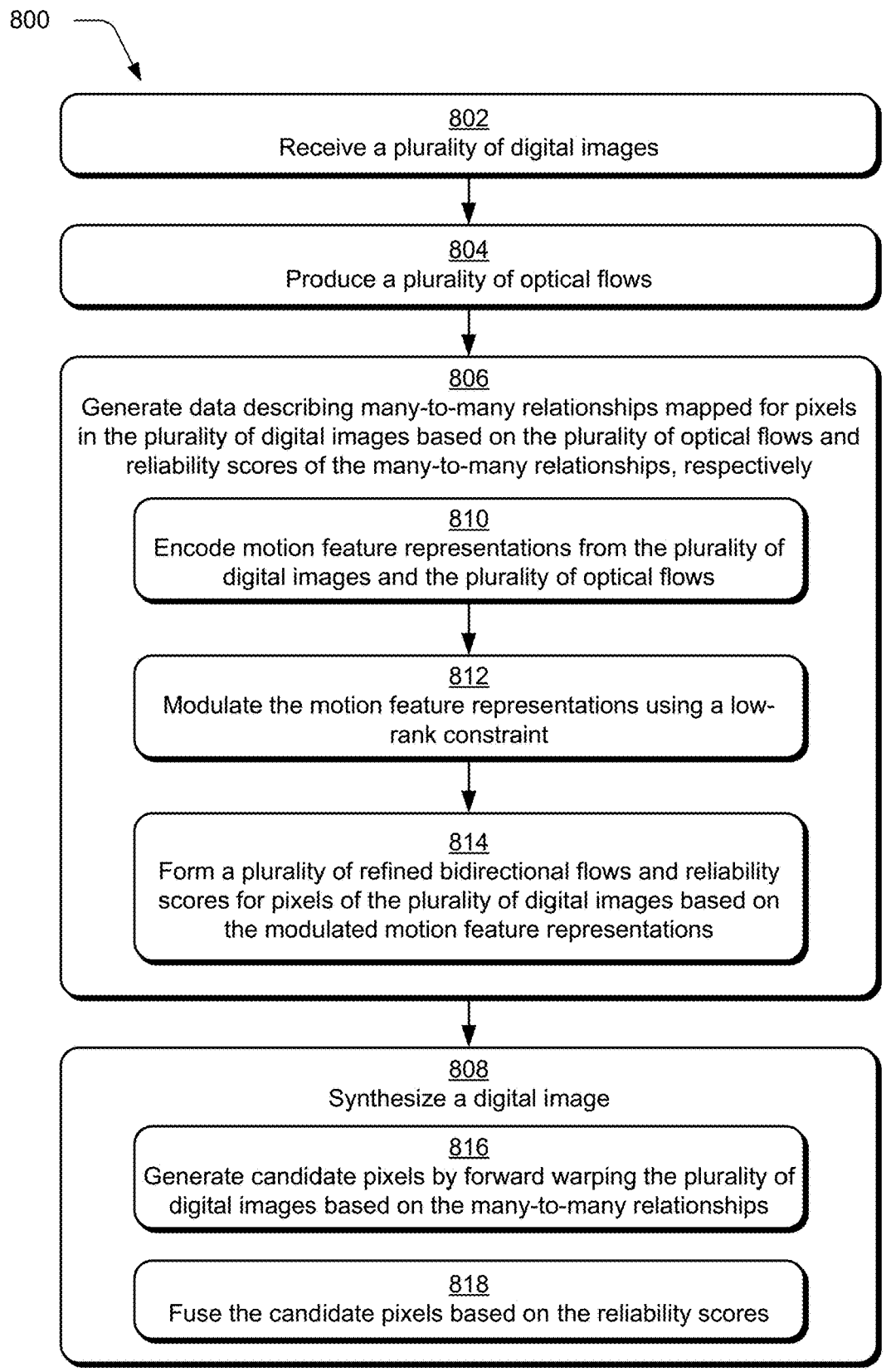
FIG. 8 is a flow diagram depicting a procedure in an example implementation of many-to-many splatting-based digital image synthesis.

FIG. 7 depicts an example system 700 showing operation of the synthesis module 220 of FIG. 2 in greater detail as leveraging pixel warping and fusion. The synthesis module 220 receives as inputs the first digital image 204 "$I_0$," the second digital image 206 "$I_1$," refined bidirectional flows 216 "$\{F_{0\rightarrow 1}^i, F_{1\rightarrow 0}^i\}_{i=1}^N$," and color reliability maps 218 "$\{S_0,S_1\}$." From this, the synthesis module 220 synthesizes the synthesized digital image 222 for a target time input 224 "t." To do so, the synthesis module 220 includes a pixel warping module 702 and a pixel fusion module 704 that uses the previously estimated multi-motion fields to forward warp pixels to a given target time step "t∈ (0, 1)" and then combine the colors of overlapping pixels in the output, respectively. Since both the warping and fusion operations are based on the pixels' colors without any subsequent post-processing steps, an intermediate frame can be interpolated with reduced computational overhead in comparison with conventional techniques as described above.

The pixel warping module 702 is configured to generate candidate pixels by forward warping the plurality of digital images based on the many-to-many relationships (block 816). For linear motion, each pixel's motion vector is scaled by the target time input 224 "t" as:

$$F_{0 \to t}^n(i_0) = t \cdot F_{0 \to 1}^n(i_0)$$

$$F_{1 \to t}^n(i_1) = (1-t) \cdot F_{1 \to 0}^n(i_1)$$

where "$i_0$" and "$i_1$" denote the "i-th" source pixel in the first and second digital images 204, 206 "$I_0$," "$I_1$," respectively. Then, a source pixel "$i_s$" is forward warped by its "n-th" motion vector to:

$$i_{s \to t}^n = \phi F(i_s, F_{s \to t}^n)$$

at time "t," with "s∈ {0, 1}" representing the source frame, "ϕF" is the forward warping operation, and "$F_{s \to t}^n$" is the "n-th" sub-motion vector of "$i_s$" as defined above.

In conventional many-to-one warping techniques, each pixel is warped to a single location in the target frame. In dynamic scenes, therefore, the motion vectors may overlap with each other thus resulting in a many-to-one propagation where the pixel set after fusion is smaller than the actual pixel set of frame. This results in visual artifacts that are viewed as holes in the target digital image. On the other hand, many-to-many splatting techniques described herein overcome such limitations by using multiple motion vectors to model the motion of each source pixel. Each pixel in the source "s" is forward warped with "N (N>1)" sub-motion vectors to "t," and obtain a set of warped pixels:

$$\hat{I}_{s \to t} = \bigcup_{n=1}^{N} \hat{I}_{s \to t}^n$$

As such, many-to-many splatting relaxes conventional restrictions that each source pixel contributes to a single location. This allows the digital image synthesis system 116 and its underlying motion estimator to learn to reason about occlusions, and model complex color interactions across a larger area of pixels.

The pixel fusion module 704 is then employed to fuse the candidate pixels generated by the pixel warping module 702 based on the reliability scores (block 818). By applying many-to-many warping to input pixels in the first and second digital images 204, 206 "$I_0$," "$I_1$," a set of warped pixels is obtained where multiple target pixels may correspond to a same pixel location:

$$\hat{I}_t = \hat{I}_{0 \to t} \cup \hat{I}_{1 \to t}.$$

To fuse warped pixels that overlap with each other, the pixel fusion module 704 leverages measures of the pixel's relative importance. Examples of which include temporal relevance 706, brightness consistency 708, and the reliability scores 710 from the color reliability maps 218.

Temporal relevance 706 "$r_i$" characterizes changes not based on motion (e.g., lighting changes) between a source frame and the target. For simplicity, linear interpolation is employable by setting "$r_i = t$" if "i" is sourced from the first digital image 204 "$I_0$" and "$r_i = 1-t$" otherwise, with "t" being the desired target time input 224.

Brightness consistency 708 "$b_i$" indicates occlusions by comparing a frame to its target through backward warping:

$$b_i = \begin{cases} -1 \cdot \|I_0(i) - I_1(i + F_{0 \to 1}(i))\|_1, & \text{if } i \in I_0, \\ -1 \cdot \|I_1(i) - I_0(i + F_{1 \to 0}(i))\|_1, & \text{if } i \in I_1, \end{cases}$$

This equation is based on motion as well as the pixels' colors, which can be affected by various factors like noise, ambiguous appearance, and changes in shading.

To enhance the robustness, the reliability score 710 is also adopted that is learned "per-pixel." As described above, the reliability score 710 "$s_i$" is jointly estimated together with the motion vectors through the motion refinement system 214, e.g., as the color reliability maps 218 "$\{S_0, S_1\}$."

With these measurements, the pixel fusion module 704 fuses overlapping pixels at a location "j" in the form of a weighted summation:

$$I_t(j) = \frac{\sum_{i \in \hat{I}_t} \mathbb{1}_{i=j} \cdot e^{(b_i \cdot s_i \cdot \alpha)} \cdot r_i \cdot c_i}{\sum_{i \in \hat{I}_t} \mathbb{1}_{i=j} \cdot e^{(b_i \cdot s_i \cdot \alpha)} \cdot r_i}$$

where "$c_i$" represents the "i-th" warped pixel's original color, "α" is a learnable parameter adjusting the scale of weights, "$\hat{I}_t$" is the set of warped pixels at time "t," and "$\mathbb{1}_{i=j}$" indicates if the warped pixel "i" is mapped to the pixel location "j." In this way, the digital image synthesis system 116 provides a solution to directly operate in the pixel color domain, supports a general framework for fusing pixels from multiple frames, and introduces a learning-based reliability score to fuse overlapping pixels in a data-driven manner.

As described above, the many-to-many splatting technique described herein is configured to efficiently synthesize digital images, e.g., to interpolate intermediate video frames. The motion refinement system 214 is used to generate data describing many-to-many relationships by mapping multiple sub-motion vectors for each pixel. These sub-motion vectors are then applied to forward warp the pixels to any desired time step, which are then fused to obtain the final output. By sharing computation for flow refinement and involving minimal use of computation resources to synthesize each image, these techniques are especially well-suited for synthesizing multiple digital images together, e.g., for multi-frame interpolation. Experiments on multiple benchmark datasets demonstrate that the described techniques achieve state-of-the-art performance with superior efficiency and as such improve operation of underlying computing devices.

Example System and Device

Figure 9:
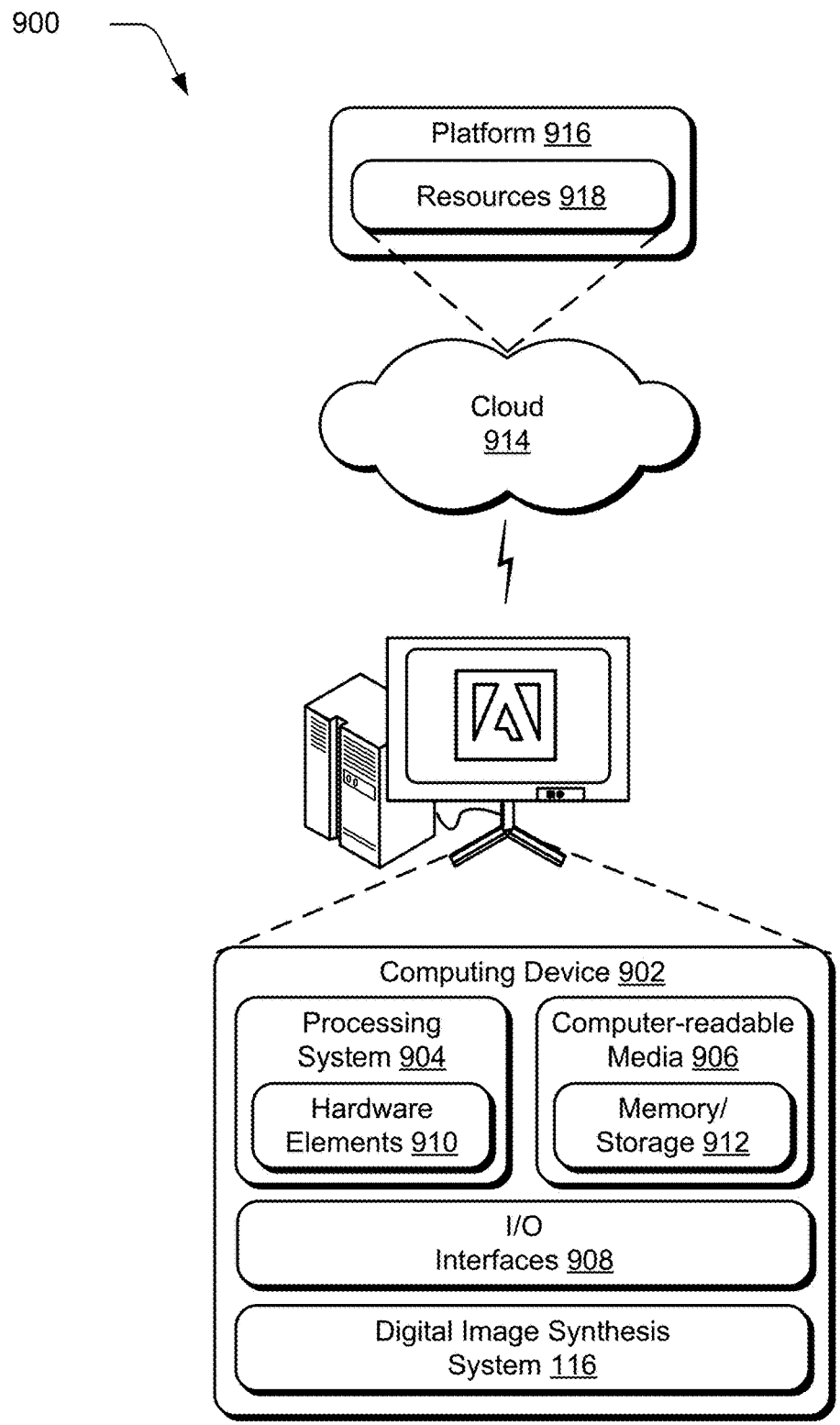
FIG. 9 illustrates an example system that includes an example computing device that is representative of one or more computing systems and/or devices that implement the various techniques described herein.

FIG. 9 illustrates an example system generally at 900 that includes an example computing device 902 that is representative of one or more computing systems and/or devices that implement the various techniques described herein. This is illustrated through inclusion of the digital image synthesis system 116. The computing device 902 is configurable, for example, as a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that is configurable as processors, functional blocks, and so forth. This includes implementation in hardware as an application specific integrated circuit or other logic device formed using one or more semiconductors. The hardware elements 910 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 906 is illustrated as including memory/storage 912. The memory/storage 912 represents memory/storage capacity associated with one or more computer-readable media. The memory/storage 912 includes volatile media (such as random access memory (RAM)) and/or nonvolatile media (such as read only memory (ROM), Flash memory, optical disks, magnetic disks, and so forth). The memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 902. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 910. The computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing system 904. The instructions and/or functions are executable/operable by one or more articles of manufacture (for example, one or more computing devices 902 and/or processing systems 904) to implement techniques, modules, and examples described herein.

The techniques described herein are supported by various configurations of the computing device 902 and are not limited to the specific examples of the techniques described herein. This functionality is also implementable all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 include applications and/or data that can be utilized while computer processing is executed on servers that are remote from the computing device 902. Resources 918 can also include services provided over the Internet and/or through a subscriber network, such as a cellular or Wi-Fi network.

The platform 916 abstracts resources and functions to connect the computing device 902 with other computing devices. The platform 916 also serves to abstract scaling of resources to provide a corresponding level of scale to encountered demand for the resources 918 that are implemented via the platform 916. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
  receiving, by a computing device, a plurality of digital images and a plurality of optical flows describing pixel movement between the plurality of digital images, respectively;
  generating, by the computing device, data describing:
    many-to-many relationships mapped for pixels in the plurality of digital images based on the plurality of optical flows; and
    reliability scores of the many-to-many relationships, respectively; and
  synthesizing, by the computing device, a synthesized digital image by forward warping the pixels of at least one said digital image based on the many-to-many relationships and fusing the forward warped pixels based on the reliability scores.

2. The method as described in claim 1, wherein the many-to-many relationships includes multiple flow vectors for a single said pixel that specify a plurality of locations, to which, the single said pixel is mapped.

3. The method as described in claim 1, wherein the many-to-many relationships are described using a plurality of refined bidirectional flows and the reliability scores are described using a plurality of color reliability maps.

4. The method as described in claim 3, further comprising generating the plurality of refined bidirectional flows, the generating including:
  encoding motion feature representations from the plurality of digital images and the plurality of optical flows;
  modulating the motion feature representations using a low-rank constraint; and
  forming the plurality of refined bidirectional flows and the reliability scores for the pixels of the plurality of digital images based on the modulated motion feature representations.

5. The method as described in claim 4, wherein the encoding the motion feature representations includes generating motion feature pyramids having levels corresponding to a plurality of resolutions.

6. The method as described in claim 5, wherein the encoding the motion feature representations includes joint flow encoding of the motion feature pyramids using the plurality of digital images and the plurality of optical flows.

7. The method as described in claim 4, wherein the motion feature representations are configured as input feature maps and the modulating includes shrinking the input feature maps.

8. The method as described in claim 4, wherein the forming the plurality of refined bidirectional flows and the reliability scores employs a decoder module as part of machine learning.

9. The method as described in claim 1, wherein the synthesizing includes:
  generating candidate pixels by forward warping the plurality of digital images based on the many-to-many relationships mapped between pixels in the plurality of digital images; and
  fusing the candidate pixels based on the reliability scores of the many-to-many relationships, respectively.

10. The method as described in claim 9, wherein the fusing is based at least in part on temporal relevance, brightness consistency, and the reliability scores.

11. A system comprising:
  a digital image input module implemented by a processing system to receive a first digital image and a second digital image;
  an optical flow generation module implemented by the processing system to generate a first optical flow describing pixel movement from the first digital image to the second digital image and a second optical flow describing pixel movement from the second digital image to the first digital image;
  a motion refinement system implemented by the processing system to generate a plurality of refined bidirectional flows and color reliability maps based on the first and second digital images and the first and second optical flows;
  a pixel warping module implemented by the processing system to generate candidate pixels by forward warping the first and second digital images based on the plurality of refined bidirectional flows; and
  a pixel fusion module implemented by the processing system to generate a synthesized digital image by fusing the candidate pixels based on the plurality of color reliability maps by merging overlapping pixels based on respective reliability scores from the plurality of color reliability maps.

12. The system as described in claim 11, wherein the forward warping includes many-to-many relationships mapped for at least one said pixel in the first or second digital images to multiple locations and the pixel fusion module resolves the many-to-many relationships based on the plurality of color reliability maps.

13. The system as described in claim 11, wherein the motion refinement system includes:
- a motion feature encoding module to encode motion feature representations from the first and second digital images and the first and second optical flows;
- a feature modulation module to modulate the motion feature representations using a low-rank constraint; and
- a decoder module to form the plurality of refined bidirectional flows and the color reliability maps based on the modulated motion feature representations.

14. The system as described in claim 13, wherein the motion feature representations are configured as motion feature pyramids having levels corresponding to a plurality of resolutions.

15. The system as described in claim 13, wherein the motion feature representations are configured as input feature maps and the feature modulation module is configured to shrink the input feature maps.

16. The system as described in claim 13, wherein the pixel fusion module is configured to fuse the generated pixels based at least in part on reliability scores of the color reliability maps as well as temporal relevance or brightness consistency.

17. A system comprising:
- means for generating a plurality of refined bidirectional flows and a plurality of color reliability maps based on a plurality of digital images and a plurality of optical flows;
- means for generating pixels by forward warping the plurality of digital images based on the plurality of refined bidirectional flows, the plurality of refined bidirectional flows including at least one many-to-many mapping of pixels to a respective location; and
- means for resolving the many-to-many mapping of the pixels to the respective location based on the plurality of color reliability maps.

18. The system as described in claim 17, wherein the refining generating means includes:
- means for encoding motion feature representations from the plurality of digital images and the plurality of optical flows;
- means for modulating the motion feature representations using a low-rank constraint; and
- means for decoding the plurality of refined bidirectional flows and the color reliability maps based on the modulated motion feature representations.

19. The system as described in claim 18, wherein the motion feature representations are configured as motion feature pyramids having levels corresponding to a plurality of resolutions.

20. The system as described in claim 17, wherein the resolving means fuses the pixels based at least in part on the color reliability maps as well as temporal relevance or brightness consistency.

* * * * *

UNITED STATES PATENT AND TRADEMARK OFFICE
CERTIFICATE OF CORRECTION

PATENT NO. : 12,169,909 B2
APPLICATION NO. : 17/714356
DATED : December 17, 2024
INVENTOR(S) : Simon Niklaus and Ping Hu Page 1 of 1

It is certified that error appears in the above-identified patent and that said Letters Patent is hereby corrected as shown below:

In the Claims

Column 16, Line 15, Claim 18, after "wherein the", delete "refining".

Signed and Sealed this
Eighteenth Day of February, 2025

Coke Morgan Stewart
*Acting Director of the United States Patent and Trademark Office*